(12) United States Patent
Mastenbrook et al.

(10) Patent No.: US 11,882,434 B2
(45) Date of Patent: Jan. 23, 2024

(54) METHOD AND DEVICE FOR COVERTLY COMMUNICATING STATE CHANGES

(71) Applicant: Western Digital Technologies, Inc., San Jose, CA (US)

(72) Inventors: Brian Edward Mastenbrook, Fremont, CA (US); David Robert Arnold, Toronto (CA)

(73) Assignee: Western Digital Technologies, Inc., San Jose, CA (US)

( * ) Notice: Subject to any disclaimer, the term of this patent is extended or adjusted under 35 U.S.C. 154(b) by 743 days.

(21) Appl. No.: 16/924,186

(22) Filed: Jul. 9, 2020

(65) Prior Publication Data

US 2022/0014905 A1    Jan. 13, 2022

(51) Int. Cl.
*H04W 12/037*    (2021.01)
*H04L 9/32*    (2006.01)

(52) U.S. Cl.
CPC ......... *H04W 12/037* (2021.01); *H04L 9/3236* (2013.01)

(58) Field of Classification Search
CPC ............... H04W 12/037; H04L 9/3236; H04L 9/0643; H04L 9/0891
See application file for complete search history.

(56) References Cited

U.S. PATENT DOCUMENTS

| | | | |
|---|---|---|---|
| 8,995,908 B2 | 3/2015 | Pedro et al. | |
| 9,286,493 B2 | 3/2016 | Johnson et al. | |
| 9,813,416 B2 | 11/2017 | Bolotin et al. | |
| 10,083,130 B2 | 9/2018 | Bolotin et al. | |
| 10,146,706 B2 | 12/2018 | Bolotin et al. | |
| 10,154,020 B1 | 12/2018 | Bolotin et al. | |
| 10,181,055 B2 | 1/2019 | Bolotin et al. | |
| 10,204,240 B2 | 2/2019 | Johnson et al. | |
| 10,271,263 B2 * | 4/2019 | Ghosh .................. | H04W 40/32 |
| 10,313,874 B2 | 6/2019 | Amundsen et al. | |
| 10,397,189 B1 * | 8/2019 | Hashmi ............... | H04L 63/0272 |

(Continued)

FOREIGN PATENT DOCUMENTS

| | | |
|---|---|---|
| DE | 102006010193 B4 | 2/2014 |
| EP | 1569103 B1 | 3/2017 |

(Continued)

OTHER PUBLICATIONS

Liu et al., "Address Knocking: an undetectable authentication based on IPv6 address", Dec. 2012, 13th International Conference on Parallel and Distributed Computing, Applications and Technologies, pp. 85-89 (Year: 2012).*

(Continued)

*Primary Examiner* — Kenneth W Chang
(74) *Attorney, Agent, or Firm* — PATENT LAW WORKS LLP (57) ABSTRACT

Disclosed herein is a device configured to covertly communicate state information within a transmitter address field of a message. The device comprises a memory configured to store a state key and state information of the device, and a controller in communication with the memory. The controller is configured to apply a one-way function, using the state key, to the state information to produce a transmitter address, and transmit the message, including the transmitter address in the transmitter address field of the message.

20 Claims, 8 Drawing Sheets

(56) References Cited

U.S. PATENT DOCUMENTS

| | | | |
|---|---|---|---|
| 2006/0209843 A1* | 9/2006 | Zhang | H04L 63/12 370/395.32 |
| 2008/0141041 A1 | 6/2008 | Molaro et al. | |
| 2010/0088527 A1 | 4/2010 | Johnson et al. | |
| 2010/0174913 A1 | 7/2010 | Johnson et al. | |
| 2010/0271964 A1* | 10/2010 | Akhter | H04L 67/563 370/252 |
| 2014/0337957 A1 | 11/2014 | Feekes | |
| 2014/0380461 A1* | 12/2014 | Doane | H04L 67/34 726/15 |
| 2015/0092697 A1* | 4/2015 | Yeow | H04W 24/10 370/329 |
| 2018/0307869 A1 | 10/2018 | Bolotin et al. | |
| 2018/0357406 A1 | 12/2018 | Bolotin et al. | |
| 2019/0007203 A1 | 1/2019 | Bolotin et al. | |
| 2019/0238423 A1* | 8/2019 | Karam | H04L 41/0866 |
| 2019/0303603 A1 | 10/2019 | Courtney et al. | |

FOREIGN PATENT DOCUMENTS

| | | |
|---|---|---|
| EP | 3103246 B1 | 12/2017 |
| EP | 3259929 A1 | 12/2017 |
| GB | 2455059 A | 6/2009 |
| WO | 2013163334 A2 | 10/2013 |
| WO | 2014056744 A1 | 4/2014 |
| WO | 2017205770 A1 | 11/2017 |
| WO | 2019077406 A1 | 4/2019 |
| WO | 2020032116 A1 | 2/2020 |

OTHER PUBLICATIONS

International Search Report and Written Opinion of Intl. Application No. PCT/US2020/062378, dated Mar. 14, 2021 (38 pages).
Athow, Desire, "SecureData SecureDrive BT 1TB review" Retrieved online, URL: <https://www.techradar.com/reviews/securedata-securedrive-bt-1tb>, accessed on Oct. 24, 2019.
Smith Lyle, "SecureData SecureDrive BT External Drive Review" Retrieved online, URL: <https://storagereview.com/securedata_securedrive_bt_external_drive_review>, accessed on Oct. 24, 2019.
Van Allen, Fox, "How to Unlock Your Computer Automatically With Your Phone" Retrieved online, URL: <https://www.techlicious.com/tip/computer-proximity-locks-for-mac-pc-chromebook/>, accessed on Oct. 24, 2019.
"DataLock BT Remote Management", Retrieved online, URL: <https://www.clevx.com/datalock-bluetooth-encrypted-security/>, accessed on Oct. 24, 2019.
"Bluetooth Core Specification" v5.1, Jan. 21, 2019.
Bon, Matthew, "A Basic Introduction to BLE Security" Retrieved online, URL: <https://www.digikey.com/eewiki/display/Wireless/A+Basic+Introduction+to+BLE+Security>, accessed on Jul. 19, 2019.
Duque, Alexis, "Deep Dive into Bluetooth LE Security" Retrieved online, URL: <https://medium.com/rtone-iot-security/deep-dive-into-bluetooth-le-security-d2301d640bfc>, accessed on Jul. 19, 2019.
Wikipedia, "Bluetooth Low Energy" Retrieved online, URL: <https://en.wikipedia.org/wiki/Bluetooth_Low_Energy>, accessed on Jul. 19, 2019.
Rosa, Tomas, "Bypassing Passkey Authentication in Bluetooth Low Energy", May 2013, Retrieved online, URL: <https://eprint.iacr.org/2013/309>.
Ryan, Mike, "Bluetooth: With Low Energy comes Low Security", Proc. 7th USENIX Conf. Offensive Technol., pp. 4, 2013.
Ren, Kai, "Bluetooth Pairing Part 5: Legacy Pairing—Out of Band" Retrieved online, URL: <https://www.bluetooth.com/blog/bluetooth-pairing-part-5-legacy-pairing-out-of-band/>, accessed on Jul. 19, 2019.
"[Deprecated] KBA_BT_1106: OOB introduction and example" Retrieved online, URL: <https://www.silabs.com/community/wireless/bluetooth/knowledge-base.entry.html/2018/01/08/oob_introductionand-DtpR>, accessed on Jul. 19, 2019.
Ren, Kai, "Bluetooth Pairing Part 3—Low Energy Legacy Pairing Passkey Entry" Retrieved online, URL: <https://www.bluetooth.com/blog/bluetooth-pairing-passkey-entry/>, accessed on Jul. 19, 2019.
Ren, Kai, "Bluetooth Pairing Part 2 Key Generation Methods" Retrieved online, URL: <https://www.bluetooth.com/blog/bluetooth-pairing-part-2-key-generation-methods/?utm_campaign=developer&utm_source=internal&utm_medium=blog&utm_content=bluetooth-pairing-part-5-legacy-pairing-out-of-band>, accessed on Jul. 22, 2019.
Ren, Kai, "https://www.bluetooth.com/blog/bluetooth-pairing-part-1-pairing-feature-exchange/?utm_campaign=developer&utm_source=internal&utm_medium=blog&utm_content=bluetooth-pairing-part-5-legacy-pairing-out-of-band" Retrieved online, URL: <https://www.bluetooth.com/blog/bluetooth-pairing-part-1-pairing-feature-exchange/?utm_campaign=developer&utm_source=internal&utm_medium=blog&utm_content=bluetooth-pairing-part-5-legacy-pairing-out-of-band>, accessed on Jul. 22, 2019.
Ren, Kai, "Bluetooth Pairing Part 4: Bluetooth Low Energy Secure Connections—Numeric Comparison" Retrieved online, URL: <https://www.bluetooth.com/blog/bluetooth-pairing-part-4/>, accessed Jul. 22, 2019.
Gomez, Carles et al., "Overview and Evaluation of Bluetooth Low Energy: An Emerging Low-Power Wireless Technology", Aug. 2012.
Kainda, Ronald et al., "Usability and Security of Out-Of-Band Channels in Secure Device Pairing Protocols", Proceedings of the 5th Symposium on Usable Privacy and Security, SOUPS 2009, Mountain View, California, USA, Jul. 15-17, 2009.
Antipa, Adrian et al., "Validation of Elliptic Curve Public Keys", Y.G. Desmedt (Ed.): PKC 2003, LNCS 2567, pp. 211-223, 2003.
Alfarjat, Ahmed Hweishel A. et al., "A Survey over the Security Issues of Bluetooth using Elliptic Curve Cryptography", International Journal of Computer Applications (0975-8887) vol. 150—No. 8, Sep. 2016.
Singh, Ravinder et al., "BLE v4.2: Creating Faster, More Secure, Power-Efficient Designs—Part 4" Retrieved online, URL: <https://www.electronicdesign.com/communications/ble-v42-creating-faster-more-secure-power-efficient-designs-part-4>, accessed Jul. 22, 2019.
"Bluetooth Secure Simple Pairing" Retrieved online, URL: <https://ndeflib.readthedocs.io/en/stable/records/bluetooth.html>, accessed Jul. 22, 2019.

* cited by examiner

METHOD AND DEVICE FOR COVERTLY COMMUNICATING STATE CHANGES

TECHNICAL FIELD

Aspects of the disclosure relate generally to secure data communication, and more specifically, to systems and methods for covertly communicating state changes of a transmitting device from the transmitting device to a receiving device.

BACKGROUND

Many different wireless devices are available for a wide range of applications, including devices for serverless, device-to-device communication. One example is the Bluetooth standard, which has gained widespread popularity. However, there remain concerns about privacy when transmitting data since wireless data packets are essentially broadcast to other devices than the authorized receiver.

SUMMARY

The present disclosure relates to a method and system for covertly communicating state information from a transmitting device within the transmitter address field of a transmitted message. It finds particular application in conjunction with devices communicating using resolvable private addresses and it will be described with particular reference thereto. However, it is to be appreciated that the present disclosure is also amenable to other like applications.

The present disclosure provides a method for a transmitting device to include information regarding the state of properties of the transmitting device, within the non-static transmitter address field of a transmitted message, by configuring the transmitter address field in accordance with a one-way function known to both the transmitter device and an authorized receiving device. Furthermore, there is provided a method for an authorized receiving device to determine whether the state of properties of the transmitting device has changed through consideration of the non-static transmitter address of a received message.

Disclosed herein is a device configured to covertly communicate state information within a transmitter address field of a message. The device comprises a memory configured to store a state key and state information of the device, and a controller in communication with the memory. The controller is configured to apply a one-way function, using the state key, to the state information to produce a transmitter address, and transmit the message, including the transmitter address in the transmitter address field of the message.

In some embodiments, applying the one-way function comprises producing a state indication data, wherein the state indication data is indicative of the state information of the device. In some embodiments, the memory is further configured to store a device identification key, and the controller is further configured to apply a hash function, using the device identification key, to the state indication data to produce a hash result.

In some embodiments, the transmitter address is a resolvable private address, and the transmitter address comprises the state indication data and the hash result. In some embodiments, the one-way function is a hash function, and the one-way function comprises hashing the state information with the state key to produce the state indication data.

In some embodiments, the memory is further configured to store a sequence parameter, and the controller is further configured to apply a sequence parameter update function to the sequence parameter to determine an updated sequence parameter, and apply the one-way function, using the state key, to the updated sequence parameter as well as the state information, to produce the transmitter address.

In some embodiments, the sequence parameter is a numerical value and the sequence parameter update function is an increment of the sequence parameter. In some embodiments, the sequence parameter update function is one of a plurality of sequence parameter update functions, and the sequence parameter update function is selected as a function of the state information.

In some embodiments, the state information comprises one or more values indicating the operational state of the device, and the controller transmits the message in response to a change in state of at least one of the one or more values which comprise the state information.

Also disclosed herein is a method, performed by a communication device, of covertly communicating state information within a transmitter address field of a message, the communication device comprising a memory, configured to store a state key and state information of the device. The method comprises applying a one-way function, using a state key, to the state information, to produce a transmitter address, and transmitting the message, including the transmitter address in the transmitter address field of the message.

Also disclosed herein is a method, performed by a communication device, for determining a change in state information of a transmitter device from a transmitter address field of a received message, the communication device comprising a memory configured to store stored state information and a state key. The method comprises receiving a message from the transmitter device, the message including a transmitter address in a transmitter address field, the transmitter address comprising received state indication data indicative of a current state information of the transmitter device, and determining, based on the received state indication data, whether the current state information is equal to the stored state information.

In some embodiments, the method further comprises, determining an expected state indication data, and determining that the current state information is equal to the stored state information if the expected state indication data is equal to the received state indication data.

In some embodiments, determining the expected state indication data comprises applying a one-way function to the stored state information, using the state key. In some embodiments, the method further comprises, storing a sequence parameter, upon determining the state information, applying a sequence parameter update function to the sequence parameter to determine an updated sequence parameter, and replacing the stored sequence parameter with the updated sequence parameter, and applying the one-way function to the updated sequence parameter as well as the stored state indication data, to determine the expected state indication data.

In some embodiments, the method further comprises, determining an anticipated state indication data, wherein the anticipated state indication data is based on an anticipated state information of the transmitter device. In some embodiments, the method further comprises, if the anticipated state indication data is equal to the received state indication data, updating the stored state information to the anticipated state information. In some embodiments, the method further comprises, updating the stored state information to the anticipated state information indicated by the anticipated state indication data. In some embodiments, the method further comprises, if the anticipated state indication data is not equal to the received state indication data, determining a second anticipated state indication data, wherein the anticipated state indication data is based on a second anticipated state information of the transmitter device.

In some embodiments, the method further comprises determining, based on the received state indication data, that the current state information is not equal to the stored state information, and transmitting a request message to the transmitter device requesting the current state information, or an indication thereof.

Disclosed herein is a device for covertly communicating state information within a transmitter address field of a message. The device comprises means for storing a state key and state information of the device, means for applying a one-way function, using the state key, to the state information to produce a transmitter address, and means for transmitting the message, including the transmitter address in the transmitter address field of the message.

BRIEF DESCRIPTION OF DRAWINGS

Non-limiting examples will now be described with reference to the following drawings, in which.

Aspects of the present invention will now be explained in further detail with the aid of the following non-limiting examples. It should be understood that these non-limiting examples are for illustrative purposes only and should not be interpreted in a manner limiting the scope of the present invention.

DESCRIPTION OF EMBODIMENTS

Wireless transmitting devices are often easily tracked by observers; however, this tracking is often undesired by end users, who may not wish to be tracked by observers. In some situations, a transmitting device may wish to communicate information, regarding the operational state of the transmitting device, to an authorized receiving device without a third party being able to determine the operational state information. Additionally, in some situations, a transmitting device may wish to communicate information, regarding the state of the transmitting device, to an authorized receiving device without a third party being aware that state information has been communicated from a transmitting device to a receiving device. Accordingly, a transmitting device may desire to covertly communicate state information to a receiving device which is authorized to receive and interpret the communicated state information.

Transmitted messages often include a field in the header of the message, which includes information indicating the origin of the message, such as the address of the transmitter of the message. Some communication methods allow for the use of non-static addresses in the transmitter address field of a transmitted message. Non-static addresses are addresses that are not uniquely and permanently assigned to a transmitting device, but are changeable and can be configured by the transmitting device. Non-static addresses are used by a transmitting device to obscure the identity of the transmitting device.

Non-static addresses may be resolvable. This means that a receiving device that has additional knowledge of the address generation can resolve the identity of the transmitter of the message by applying a function to the non-static address. Alternatively, non-static address may be non-resolvable, which means that a client device cannot determine the identity of the transmitter of the message. A transmitting device may choose to generate a different non-static address periodically, perhaps at random intervals, to prevent long term tracking of the transmission activity of the device.

Covertly Communicate a Change of State Information within an Address Field

In some situations, a transmitting device seeks to communicate information about properties of the transmitting device, such as the current state of properties of the transmitting device, to an authorized receiving device, herein called client device, without a third party being able to determine the property information. Furthermore, a transmitting device may seek to communicate property information without a third party being aware that property information has been communicated from a transmitting device to a client device. Accordingly, a transmitting device may desire to covertly communicate property information to a client device which is authorized to receive and interpret communicated property information.

Disclosed herein is a method for a transmitting device, herein called a server device, to covertly communicate property information to a client device within the transmitter address field of a message. In broad terms, the server device determines the current property information of the server device, applies a one-way function to the property information to produce a transmitter address, and transmits the message. The transmitter address may be used by the client device receiving the message to determine whether the property information has changed.

Network Diagram

Figure 1:
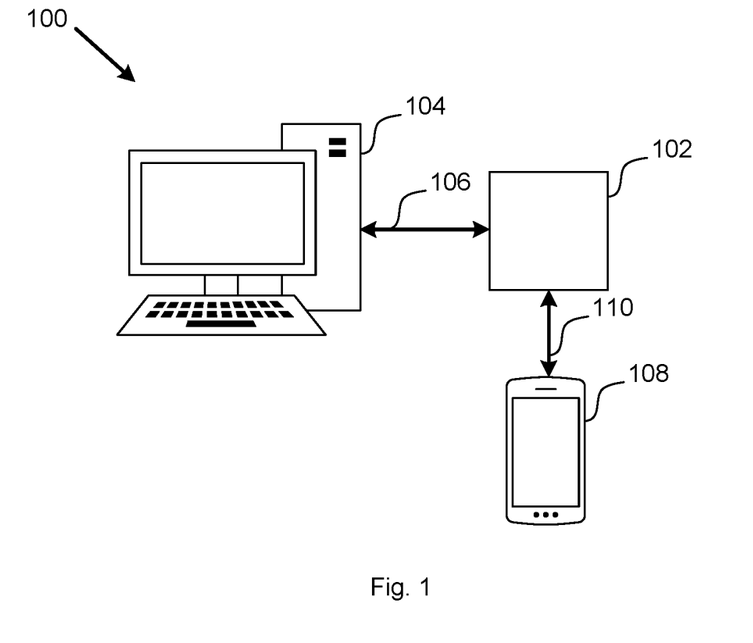
FIG. 1 illustrates a computer network including a server device and a client device, according to an embodiment.

FIG. 1 illustrates computer network 100 including a server device 102 and a client device 108, according to an embodiment. In the example illustrated in FIG. 1, server device 102 is a data storage device, such as a hard disk drive (HDD) or solid state drive (SSD). Client device 108 is a control device which is used by a user of the data storage device 102 to monitor and control the operation of the data storage device 102. In this embodiment, the client device 108 is a smart phone. In other embodiments, the authorized device may be a personal computer or other device in communication with the server device 102.

FIG. 1 also illustrates a host computer system 104 in communication with the data storage device 102, via a data channel 106, such as a Universal Serial Bus (USB), a Fibre Channel (FC), a Serial ATA (SATA), a Serial Attached SCSI (SAS), SCSI Parallel Interface (SPI) or others. The data channel may be a wire-based or wireless communication channel.

Server device 102 is communicatively connected to client device 108 via a control channel 110, and covertly communicates state information to client device 108 via the control channel 110. Accordingly, in the example illustrated in FIG. 1, device 102 is a server device, which communicates state information to device 108. Device 108 is a client device which receives messages transmitted by server device 102.

The control communication channel 110 may be a Bluetooth Low Energy (LE) connection. In other embodiments, the authorized device may be a personal computer or other communication device, and the control communication channel may be a wire-based or wireless communication channel (using any suitable communication protocol, not just Bluetooth LE).

The communication protocol via which the server device 102 transmits messages may be a synchronous or an asynchronous communication protocol. Accordingly, in some examples the server device 102 directly transmits messages to the client device 108. In other examples, the server device 102 broadcasts messages, which the client device 108 can receive when the client device is in a receptive range to receive the broadcast message.

Server Architecture and Client Architecture

Figure 2:
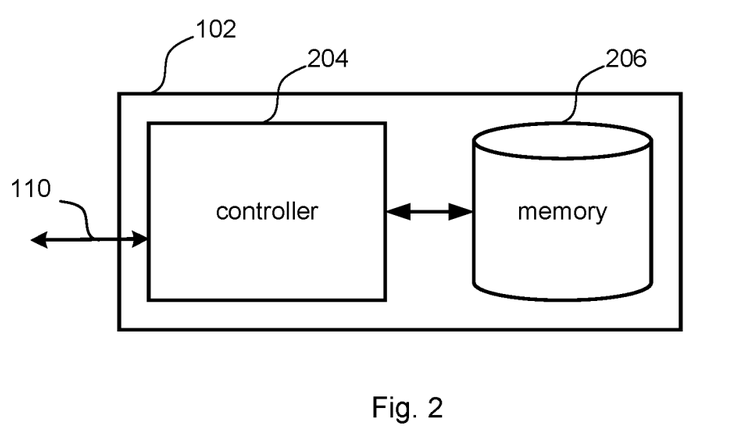
FIG. 2 is a block diagram illustrating components of the server device of FIG. 1, according to an embodiment.

FIG. 2 illustrates the components of an example server device 102, according to an embodiment. Server device 102 comprises a controller 204 which comprises hardware circuitry, such as a microcontroller with an x86, Reduced Instruction Set Computing (RISC), Advanced RISC Machine (ARM), or other architecture. The controller 204 of the server device 102 comprises a transceiver configured to receive and transmit messages via communication channel 110.

The server controller 204 is communicatively coupled to memory 206. Memory 206 comprises program memory which stores program code defining the functionality of the server device 102. Memory 206 further comprises data memory storing a property database defining the states of properties of the server device 102.

Figure 3:
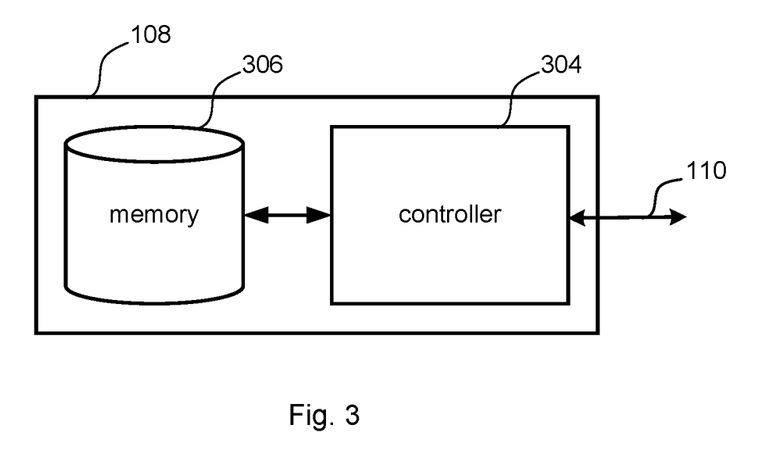
FIG. 3 is a block diagram illustrating components of the client device of FIG. 1, according to an embodiment.

FIG. 3 illustrates the components of an example client device 108, according to an embodiment. Client device 108 comprises a controller 304 which comprises hardware circuitry, such as a microcontroller with an x86, Reduced Instruction Set Computing (RISC), Advanced RISC Machine (ARM), or other architecture. The controller 304 of the client device 102 comprises a transceiver configured to receive and transmit messages via communication channel 110.

The client controller is communicatively coupled to memory 306. Memory 306 comprises program memory which stores program code defining the functionality of the client device 108.

State Information

In the example illustrated in FIGS. 1 to 3, the server device 102 is a data storage device and the client device 108 is a device which is authorized to monitor and control the properties of the data storage device. In this example, the data storage device 102 maintains a property which describes the current state of lock of the data storage device. Potential states of the lock property of the data storage device 102 include: locked; unlocked; locking; and unlocking. In response to the data storage device changing from one lock state to another lock state, the data storage device, as a server device, covertly communicates the change of the lock property to the client device 108.

Resolvable Private Address

In the example described in relation to FIGS. 1 to 3, the server device 102 covertly communicates a change of state of a property within a private address within the address field of a Bluetooth LE message, which is broadcast within the reception range of the client device 108.

The Bluetooth Low Energy standard ('Bluetooth LE') provides for the use of private addresses by a transmission device if the transmission device wishes to remain private during the transmission of messages. Private addresses can be periodically changed so that the device cannot be tracked.

According to the Bluetooth LE standard, a private address may be a resolvable private address or a non-resolvable private address. A non-resolvable private address is an address that is randomly or pseudo-randomly produced and cannot be anticipated by an observer or a recipient of a message. Accordingly, a recipient of a message cannot determine, by consideration of the address in isolation, the source of the message.

In contrast, a resolvable private address is an address that can be resolved by a recipient that has the pre-shared hash key of the transmitting device. Accordingly, only recipients who have access to the pre-shared hash key are able to resolve the private address to determine the source of the message.

In the example illustrated in FIGS. 1-3, the hash key, called a server device identification key (IDK), is shared with the client device 'out of band', meaning that the client device 108 obtains the IDK through a communication channel other than the communication channel 110.

In another example, the client device may be pre-configured with the server device's IDK during manufacture or installation. Alternatively, a server device's IDK may be transmitted by a server device to a client device during a pairing process, such as over near field communication (NFC).

A client device may store a plurality of IDKs, one for each server device that has shared an IDK with the client device. In such a situation, the client device would be authorized to receive and interpret messages from a plurality of server devices, and the client device would retain, in memory 306, a list of server identification indicators (such as server device names), and associated IDKs.

Figure 4:
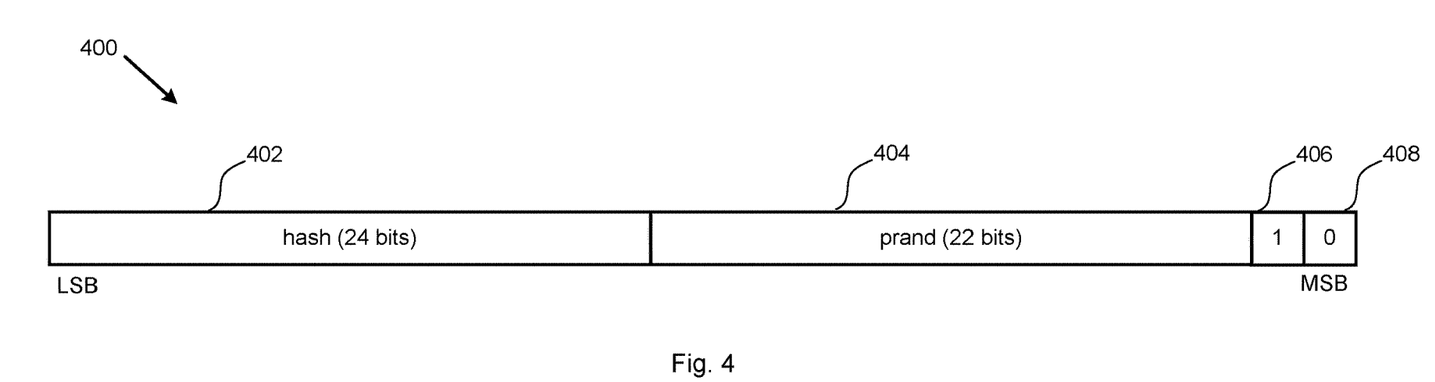
FIG. 4 illustrates the format of a resolvable private address.

FIG. 4 shows the format of a resolvable private address, in accordance with the Bluetooth LE protocol. The two most significant bits 406 and 408 signify the address type. In the address 400 depicted in FIG. 4, the two most significant bits are 0 and 1, which signify that the address is a resolvable private address in accordance with the Bluetooth LE protocol. A 22-bit string 404 called prand, is located adjacent to the two most significant bits. The prand is a pseudo-randomly generated number.

The least significant 24-bits contain a hash result 402, which is calculated by applying a hash function, using an identification key associated with the server device, over the prand. A client device, that has the server's identification key, and receives a message including address field 400, can determine if the message originated from the server device.

As noted above, address field 400 is a resolvable private address, which obscures the identity of the server device from entities which do not have the server's identification key, and therefore can be considered to be not authorized to receive and interpret messages from that server device.

Resolving a Resolvable Private Address

A client device 108 receiving a message comprising address field 400, may resolve a resolvable private address by applying a hash function, using a server device's IDK, to the prand 404, to calculate a hash result. In one example, the hash function applied by the client device 108 is the same as the hash function applied by the server device 102 when configuring the resolvable private address. Accordingly, the hash function is known to both the server device 102 and the client device 108. The server device and the client device may be preconfigured with the hash function. Alternatively, in another example, the server device and the client device share the hash function prior to communicating through messages that include resolvable private addresses.

If the hash result calculated by the client device equals the transmitted hash result 402 (as provided in the 24 least significant bits of the resolvable private address field), then the client device determines that the received message was transmitted by the server device associated with that IDK.

Alternatively, if the client calculated hash result does not equal the transmitted hash result 402, the client determines that the received message was not transmitted by the server device associated with that IDK. If the client device has stored a plurality of IDKs, each associated with one of a plurality of server devices, the client device may iteratively (or in parallel) calculate a hash result using each of the stored IDKs, to determine which IDK, and, by association, which server device, transmitted the message.

Non-Resolvable Private Addresses

In another embodiment, the server device 102 is configured to transmit messages over the communication channel 110 using non-resolvable private addresses. A non-resolvable private address is an address that obscures the identity of the message transmitter, i.e. the server device. In contrast, with a resolvable private address, a recipient of a message transmitted using a non-resolvable private address cannot identify the transmitter of the message, via the address field of the message. It is noted, that there may be other means by which a recipient device can identify the transmitter of a message which has been sent using a non-resolvable private address.

Covertly Communicating Information in Prand Field

Figure 5:
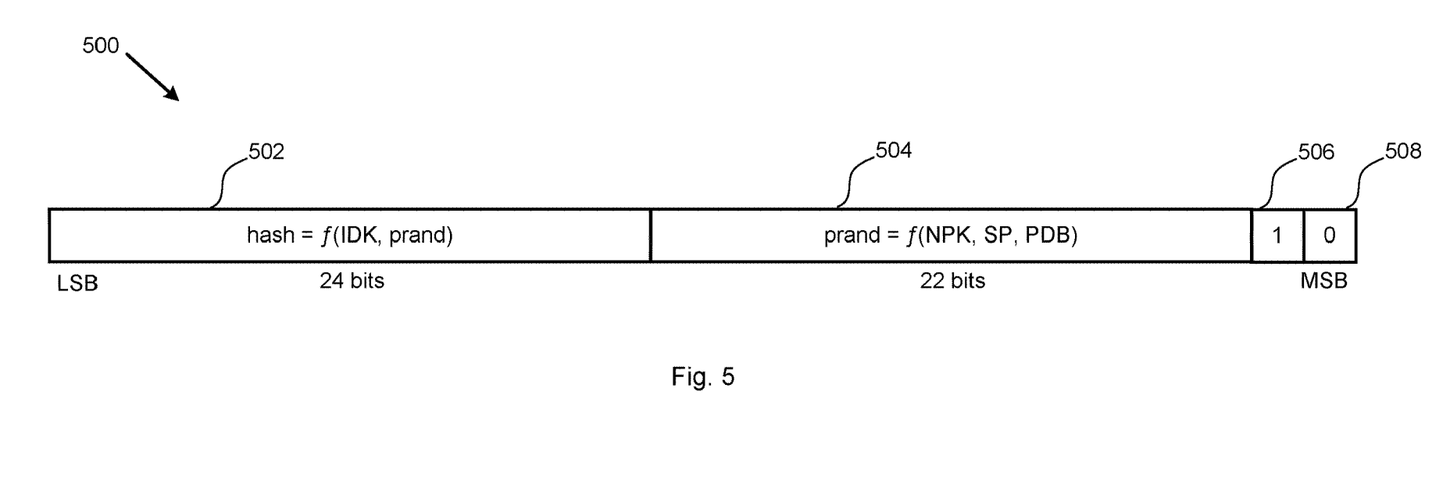
FIG. 5 illustrates the format of a resolvable private address, according to an embodiment.

FIG. 5 illustrates the fields of an example resolvable private address 500, of a message transmitted by server device 102, and received by client device 108, in accordance with an embodiment. With similarity to the hash field 402 of resolvable private address 400, the hash field 502 is the result of applying a hash function, using the server device's identification key (IDK), to the prand field 504. As described in relation to FIG. 4, the client device 108 can apply the same hash function, using the pre-shared server identification key, to the prand field 504, to verify that the message originated from server device 102. In the example illustrated in FIG. 5, the two most significant bits 506 and 508 are set to 0 and 1, which signify that the address is a resolvable private address in accordance with the Bluetooth LE protocol.

Unlike the prand field 404 of FIG. 4, the prand field 504 is not a pseudo-randomly generated number. Prand field 504 is the result of applying a one-way function, which takes as inputs a Notification Property Key (NPK), the state of properties in a property database (PDB), and in some examples a sequence parameter (SP), and outputs state indication data. A one-way function is a function that is computationally easy to compute in one direction but is not able to be inverted or is computationally inefficient to invert.

When producing the resolvable private address 500, the server device 102 sets the prand value 504 to the state indication data (which is the output of the one-way function), and sets the hash field 502 to the result of applying a hash function to the prand value 504 using the server IDK.

Because the prand value 502 is the output of the one-way function using the state of the properties in the property database, the prand value 502 contains information which is not apparent to a third party who receives a message containing address field 500. Accordingly, the server device 102 is able to covertly communicate information regarding the state of the properties in the property database within the transmitter address field 500. In other words, if the state of the properties changes, the address field 500 changes differently compared to the case where the state of the properties does not change.

As shown in FIG. 4, the resolvable private address field, in accordance with the Bluetooth LE protocol, is 48 bits long, with 22 bits for a random prand value, and 24 bits for the hash of that value using the server device identification key. If the prand values are selected uniformly at random, the expected number of n-bit prand values to be used to observe a repeat (collision) of the random number is roughly $2^{(n/2)}$. This is approximately four thousand prand values for the 22 bit prand field. A collision of a prand value enables the server device to be identified, by a third party, as a server device that has transmitted messages before. To reduce the risk of a collision, and thereby increase the privacy of the server device, the number of bits in the prand field may be increased, and the server device may be configured to generate a resolvable private address in an address field larger than 48 bits. Accordingly, in one example, the server device generates a resolvable private address within the protocol data unit of a Bluetooth LE advertising data packet.

It is noted that, in accordance with this disclosure, embodiments of the server device could be configured to generate notification messages in accordance with any one of numerous different packet formats, and the location and size of the transmitter address field within the notification message may differ from one embodiment to another embodiment. A client device, configured to communicate with the server device, will be configured to identify the location and format of the transmitter address field within a received notification message.

One-Way Function

A one-way function is a function that is computationally easy to compute in one direction but is not able to be inverted or is computationally inefficient to invert. In one example, the one-way function is a message authentication function with produces a message authentication code (MAC). A MAC is a short piece of information used to authenticate a message, to confirm that the message originated from the espoused sender, and that the message has not been changed. A message authentication function cryptographically applies a key over information to calculate the MAC.

In another example, the one-way function is a hash function, that applies a key to information to produce a hash result. In another example, the one-way function is an encryption function.

Message Flow

Figure 6:
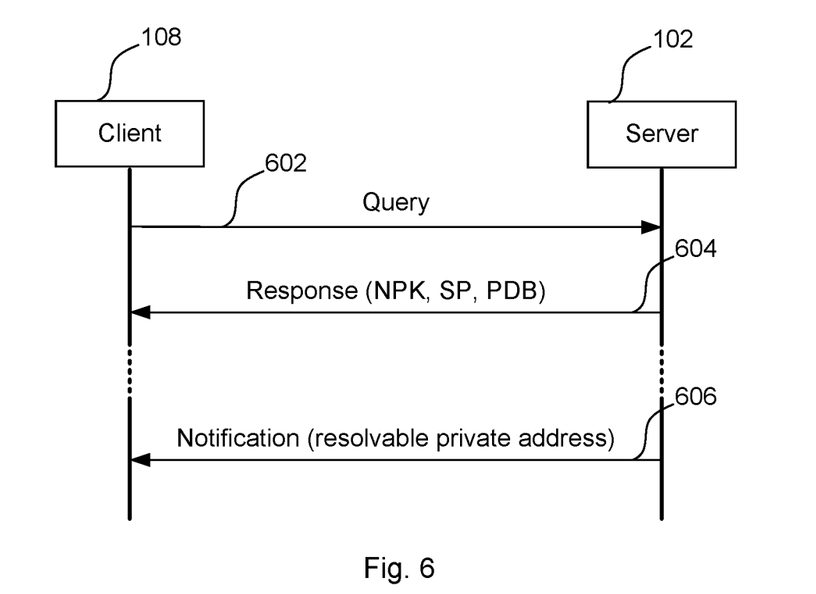
FIG. 6 illustrates the flow of messages communicated between a server device and a client device, according to an embodiment.

FIG. 6 illustrates the flow of messages transmitted between a client device 108 and a server device 102, according to an embodiment. This flow is typically performed after the client device 108 establishes the communication channel 110. This may follow the pairing of the server device 102 with the client device 108, such as by using the Bluetooth LE protocol or by other pairing methods. Then, the client device 108 queries the server device 102, by transmitting a query message 602, for the value of the Notification Property Key (NPK), the current sequence parameter (SP) and the current state of properties within the property database (PDB). The server device 102 responds by transmitting a response message 604 which contains the NPK, the current sequence parameter (SP) and the current state of properties within the property database (PDB).

Upon receipt of the response message 604, the client device stores the NPK, the SP and the PDB in client device memory 306. At this stage, the client device and the server device are both configured to a shared initial state, with regard to the value of the NPK, the PDB and the SP.

At some time later, as triggered by either a property update event or a privacy update event (described below), the server device 102 broadcasts a notification message 606. The address field of the notification message 606 is a resolvable private address, in accordance with Bluetooth LE. However, the resolvable private address of notification message 606 contains obfuscated information regarding the state of properties within the property database. Specifically, in this example, the prand field of the resolvable private address contains obfuscated information regarding the state of properties within the property database, as the server device has determined the prand field as a function of the Notification Property Key (NPK), the current values of the property database (PDB), and a sequence parameter (SP).

For the example illustrated in FIG. 6, a notification message may be a message in accordance with the Bluetooth LE protocol. The message may include payload. The payload may be of use to the client device or may be superfluous.

Notification Property Key (NPK)

Upon pairing with the client device 108, the server device 102 generates a Notification Property Key (NPK) uniformly at random. In other examples, a server device may generate a NPK prior to pairing with a client device, or a server device may be preconfigured with a NPK rather than generating the NPK. The notification property key is also called the state key.

The server device 102 broadcasts the NPK within the response message 604. The client device 108 receives response message 604 and stores the NPK within the client device's memory 306.

Alternatively, in another example, both the client device 108 and the server device 108 can be preconfigured with the same NPK. In such an example, the server device does not include the NPK within the response message 604. In another example, the NPK can be shared 'out of band' between the server device and the client device, via a communication channel different to communication channel 110. In one example, the server device transmits a seed value indicative of the NPK, rather than the NPK itself, and the client device generates the NPK from the seed value.

Property Database

The property database contains state information for one or more properties of the server device. The one or more properties comprise properties for which the server device will broadcast notifications if the states of those properties change. The properties define the operational state of the server device.

In one example, the server device is a Bluetooth LE enabled door lock, and the property database contains a property which indicates whether the door is currently locked or unlocked. In another example, the server device is a data storage device, and the property database contains properties which indicate the lock state of the data storage device, and the current operational state. A state value of 'locked' of the data storage device may indicate that encrypted user content data stored on the data storage device cannot be decrypted. For example, the decryption key may not be available. A state value of 'unlocked' may indicate that the decryption key is available and encrypted user content data can be decrypted. Additionally, the property database may contain properties which indicate the available capacity of the data storage device, the security configuration of the data storage device and/or other properties of interest to an authorized user of the data storage device.

The server device 102 broadcasts the current value of the properties in the property database within the response message 604. The client device 108 can receive the response message 604 and store the property database within the client's device memory 306. Alternatively, in another example, the client device 108 is configured to initiate the properties of the property database to set initialisation values upon pairing with the server device 102. In such an example, the server device 102 does not include the property database within the response message 604.

Figure 7:
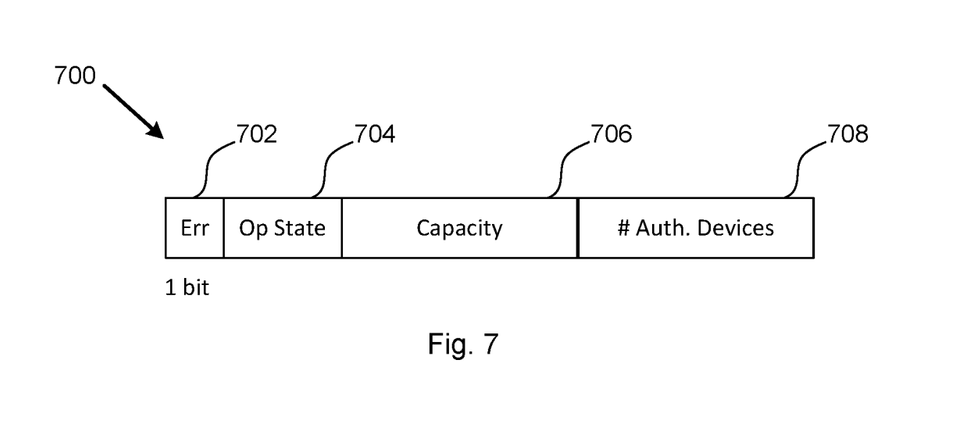
FIG. 7 illustrates the format of a property database, according to an embodiment.

FIG. 7 illustrates an example property database 700 for a server device 102 which is a data storage device. The property database 700 comprises four fields, stored as concatenated bit strings 702, 704, 706 and 708. Bit 702 represents an error property of the data storage device 102, wherein the setting of this bit 702 indicates that the data storage device 102 is in an error state. The operational state of the data storage device 102 (locked, unlocked, locking, unlocking) is represented by field 704. The available capacity, for the storage of user data, is represented by field 706. The number of authorized devices that are authorized to store data on the data storage device 102 is represented by field 708.

Property database 700 is maintained by the controller 204 of the server device 102, and a copy of the property database 700 is maintained by the controller 304 of the client device 108.

Sequence Parameter

Figure 8:
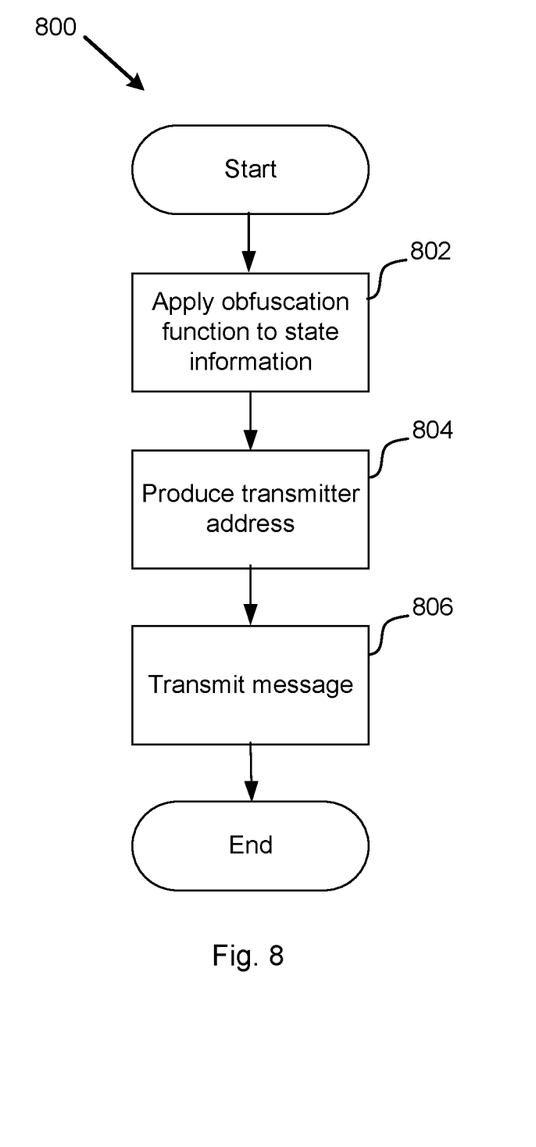
FIG. 8 is a flowchart illustrating a method as performed by a server device, according to an embodiment.

In some examples, the sequence parameter (SP) is incorporated into the one-way function to avoid reuse of the prand in the event that a property is changed to a new value, and then changed back to its original value. The current sequence parameter is stored in the memory 206 of the server device 102. The client device also maintains a sequence parameter value stored in memory 306. An example sequence parameter 800 is illustrated in FIG. 8.

For examples in which a sequence parameter is incorporated into the one-way function, in response to pairing with the client device 108, the server device 102 initiates the sequence parameter 800 to an initial sequence parameter value. In one example, the initial sequence parameter value is communicated to the client device in the response message 604, and the client device 108 stores the initial sequence parameter as the current sequence parameter value in memory 306. In another example, the client device is configured to initiate the sequence parameter to an initial sequence parameter value which is the same as the server device's initial sequence parameter value. In such an example, the server device 102 does not include the sequence parameter within the response message 604.

Establishing a Shared Initial State

So that the client device 108 can determine whether a property within the server device's property database has changed state (i.e. a property update event), the client device and the server device need to establish a shared initial state for the properties within the property database.

The shared initial state may be a preconfigured state as defined within the program code, firmware or hardware of the server device and the client device. In one example, the program code of each of the server device and the client device configures the server device and the client device, respectively, to set the property database (and the sequence number, if used) to a shared initial state immediately following successful pairing of the server device with the client device. In such an example, the client device does not transmit a query message 602 to the server device, and the server device does not respond to the query message with a response message 604.

In another example, the shared initial state is negotiated or communicated via a communication channel different from the communication channel 110. This is considered to be out of band communication of the shared initial state. Similarly, in this example, there is no need for the client device to transmit a query message 602 to the server device, and for the server device to respond to the query message with a response message 604.

Sequence Parameter Update Function

The sequence parameter is updated by both the server device and the client device in accordance with an update function known to both the server device and the client device, such that the sequence parameter stored on the client device is the same as the sequence parameter stored on the server device.

In one example, the sequence parameter is an integer and the sequence parameter update function is a numerical increment function, which wraps around to zero. In another example, the sequence parameter is a one-hot-encoded bit sequence, and the sequence parameter update function is a right shift function. In another example, the sequence parameter is an integer, and the sequence parameter update function is a mathematical function known by both the server device and the client device. In yet another example, the sequence parameter is a bit sequence, and the sequence parameter update function is a hash function applied to the bit sequence.

The server device 102 applies the update function to the sequence parameter to determine a new sequence parameter before transmitting a notification message. The server device 102 uses the new sequence parameter value when calculating the prand for the notification message. Similarly, the client device 108 updates the sequence parameter upon receipt of each notification message, and uses the new sequence parameter value when calculating the expected prand value.

In another example, the sequence parameter update function, as applied by the server device to the sequence parameter, may update the sequence parameter only when determining the prand for notification messages triggered by a property update event. In accordance with such an example, the sequence parameter is not updated when the server device transmits a notification message triggered by a privacy update event. Alternatively, the client device 108 may update the sequence parameter only when the data in the property database has been updated.

Numerous variations of the sequence parameter and the sequence parameter update function are possible. In each example, both the client device and the server device know the initial sequence parameter value, and both the client device and the server device know the sequence parameter update function. In some situations, the server device and the client device will be preconfigured with the sequence parameter update function. In other situations, the server device communicates the sequence parameter update function, or an indication thereof, to the client device during establishment of the communication channel 110 between the two devices, or within the response message 604.

Accordingly, the sequence parameter update function may be a rolling code function, in which the sequence parameter is updated by a sequence parameter update function, known by both the sender and the receiver of the notification message, so that the same sequence parameter value is not used multiple times, or at least not used multiple times in sequence. The sequence parameter update function may be a pseudo-random value generator that is seeded with the same value for the server device 102 and the client device 108.

Advantageously, as the client device knows the sequence parameter update function used by the server device but other observers do not. Therefore, the state indication data produced by the one-way function acts like a rolling code, in case there is no state change of a property of the property database. If the state indication data produced by the one-way function differs from the next anticipated state indication data, according to the next sequence parameter, the client device 108 can infer that a state change has occurred. Advantageously, this covert communication of state change from a server device to a client device occurs via a single notification message.

Server Device Method

FIG. 8 illustrates a method 800 as performed by the controller of the server device 102, to form and to transmit a notification message which covertly communicates property state information within the transmitter address field of the notification message. The server device 102 performs method 800 in response to a property in the property database changing state. This is called a property update event.

Additionally, in one example, the server device 108 also performs method 800 at other times, irrespective of whether a property in the property database has changed state. This is called a privacy update event. Broadcasting notification messages at irregular intervals, irrespective of whether a property in the property database has changed state, may assist in obfuscating the timing of changes of properties in the property database. Accordingly, unauthorized third parties who may be monitoring messages broadcast from the server device, cannot distinguish between notification messages broadcast as triggered by a property update event and notification messages broadcast as triggered by a privacy update event.

In step 802, the server device 102 applies a one-way function, in this example a message authentication function, to state information pertaining to the state of properties in the property database, to produce a MAC, herein called state indication data. In this example, the server device 102 is a data storage device, and the property database 700 is stored in memory 206.

In one example, the message authentication function applies the notification property key over the property database and the sequence parameter, and outputs a MAC value for inclusion in a resolvable private address 500.

In another example, the one-way function comprises a hash function, using the notification property key, of the concatenation of the sequence parameter and the property database. Alternatively, the one-way function comprises a hash function, using the notification property key, of at least the sequence parameter 800.

In some embodiments, the one-way function comprises two different one-way functions. If method 800 was triggered by a property update event, in which a state of a property of the property database has been updated, the controller 204 of the server device 102 applies one of the one-way functions, using the notification property key, to the sequence parameter. Alternatively, if the method 800 was triggered by a privacy update event, and the property database has not changed, the controller 204 of the server device 102 applies the other one-way function, using the notification property key, to the sequence parameter.

In another example, if method 800 was triggered by a property update event, in which a state of a property of the property database has been updated, the controller 204 of the server device 102 applies the one-way function, using the notification property key, to the sequence parameter. Alternatively, if the method 800 was triggered by a privacy update event, and the property database has not changed, the controller 204 of the server device 102 applies the one-way function, using the notification property key, to a value other than the sequence parameter.

In accordance with one example, the one-way function is an encryption function, which uses the notification property key as an encryption key. In one example, the server device applies an encryption function over the concatenation of the property database and the sequence parameter.

In step 804, the controller 204 of the server device 102 uses the one-way function output to produce a transmitter address. In the example illustrated in FIGS. 1 to 3, the server device 102 transmits a notification message 606, which has a format in accordance with the Bluetooth LE protocol. The notification message 606 has a resolvable private address field 500, which includes a prand field 504. The controller 204 of the server device 102 sets the prand field 504 to be the one-way function output. The controller 204 calculates a hash result by applying a hash function to the one-way function output, using the server device identification key (IDK), and sets the hash field 502 to be equal to that hash result. The concatenation of the hash result 502, the prand 502 and the format bits 506 and 508 for the resolvable private address 500 of the notification message 606.

In another example, the controller 204 of the server device 102 produces the transmitter address in accordance with a non-resolvable private address.

It will be appreciated by persons skilled in the art that numerous variations of producing the transmitter address are possible.

Client Device Method

Figure 9:
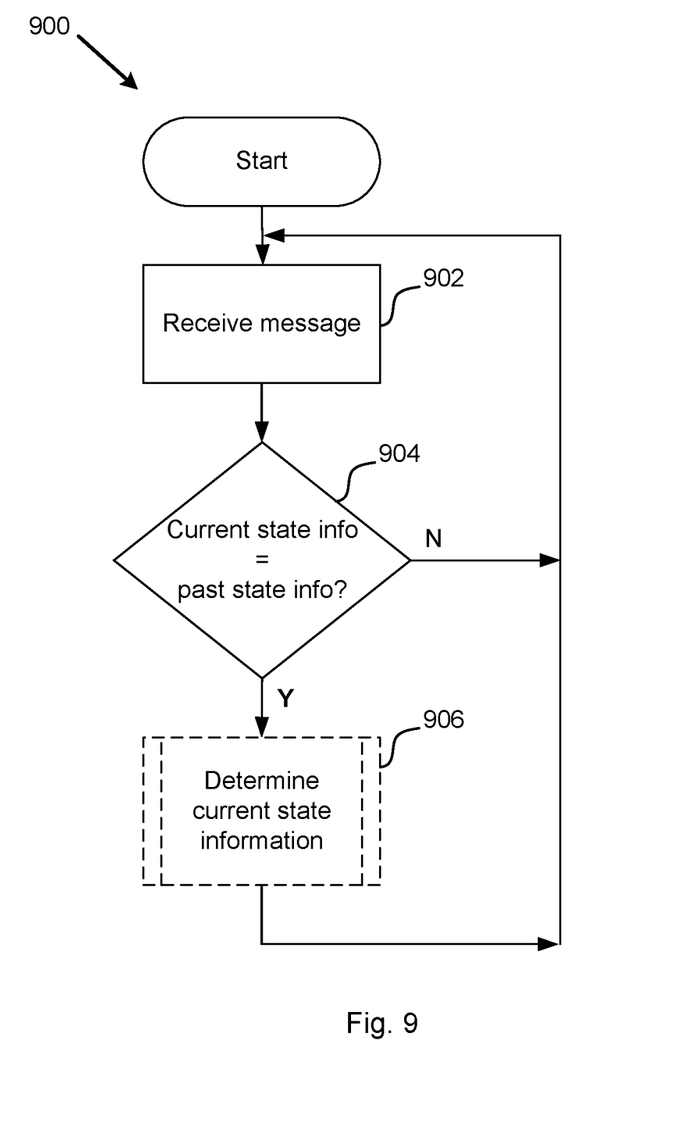
FIG. 9 is a flowchart illustrating a method as performed by a client device, according to an embodiment.

FIG. 9 illustrates a method 900 as performed by the controller 304 of the client device 108, according to an embodiment. Step 902 of method 900 is triggered by the controller 304 receiving a notification message 606 from a server device 102. The notification message may be transmitted directed to the client device 108 from the server device 102, or may be broadcast by the server device 102 within reception range of the client device 108.

In step 902, the controller 304 receives the message and determines that it is a notification message. The notification message 606 is in accordance with the Bluetooth LE standard, and has a resolvable private address in the address field, as indicated by bits 506 and 508. Accordingly, the client device 108 resolves the resolvable private address to determine the identification of the server device that broadcast the notification message 606.

As noted above, the client device 108 can resolve the resolvable private address by iteratively applying hash functions to the prand field 504, using device identification keys (IDKs) of each server device to which the client device has paired, until the hash result of the hash function is equal to the hash field 502.

In another example, the transmitter address is not a resolvable private address, and the controller 304 of the client device 108 does not resolve the address to determine the identity of the transmitting server device.

In step 904, the controller 304 of the client device considers the transmitter address to determine whether the server device 102 has covertly communicated a change of state of a property of the property database. In one example, in step 904, the client device calculates an expected prand value, by applying the one-way function using the notification property key, the current sequence parameter and the current contents of the property database stored in client device memory 306. More particularly, for examples in which the one-way function is a message authentication function, the client device calculates the expected prand to be a MAC of the current sequence parameter and the current contents of the property database, using the notification property key.

If the client device determines that the expected prand value does not equal the prand value within the transmitter address field of the received notification message, the client device determines that the server device has covertly communicate a change of state of a property of the property database.

Alternatively, if the client device determines that the expected prand values equals the prand value within the transmitter address field of the received notification message, the client device determines that the property database of the server device has not changed. In this situation, the received notification message is a privacy update message, rather than a property update message.

As both the server device and the client device know the prand calculation function, the client device can determine when the prand value included in a notification message, transmitted by the server device, differs from the prand value expected by the client device. Through this determination, the client device can recognise that a property update event has occurred at the server device.

In some examples, the client device performs step 906, in which the client device determines the current state of the property database of the server device. Depending upon client device By requesting the current property database (or the change thereto) from the server device, or by anticipating the change to the property database, or by decrypting the property database information from the transmitter address of the notification message. Each of these configurations for step 906 is described in further depth below.

Request Current State Information

Figure 10:
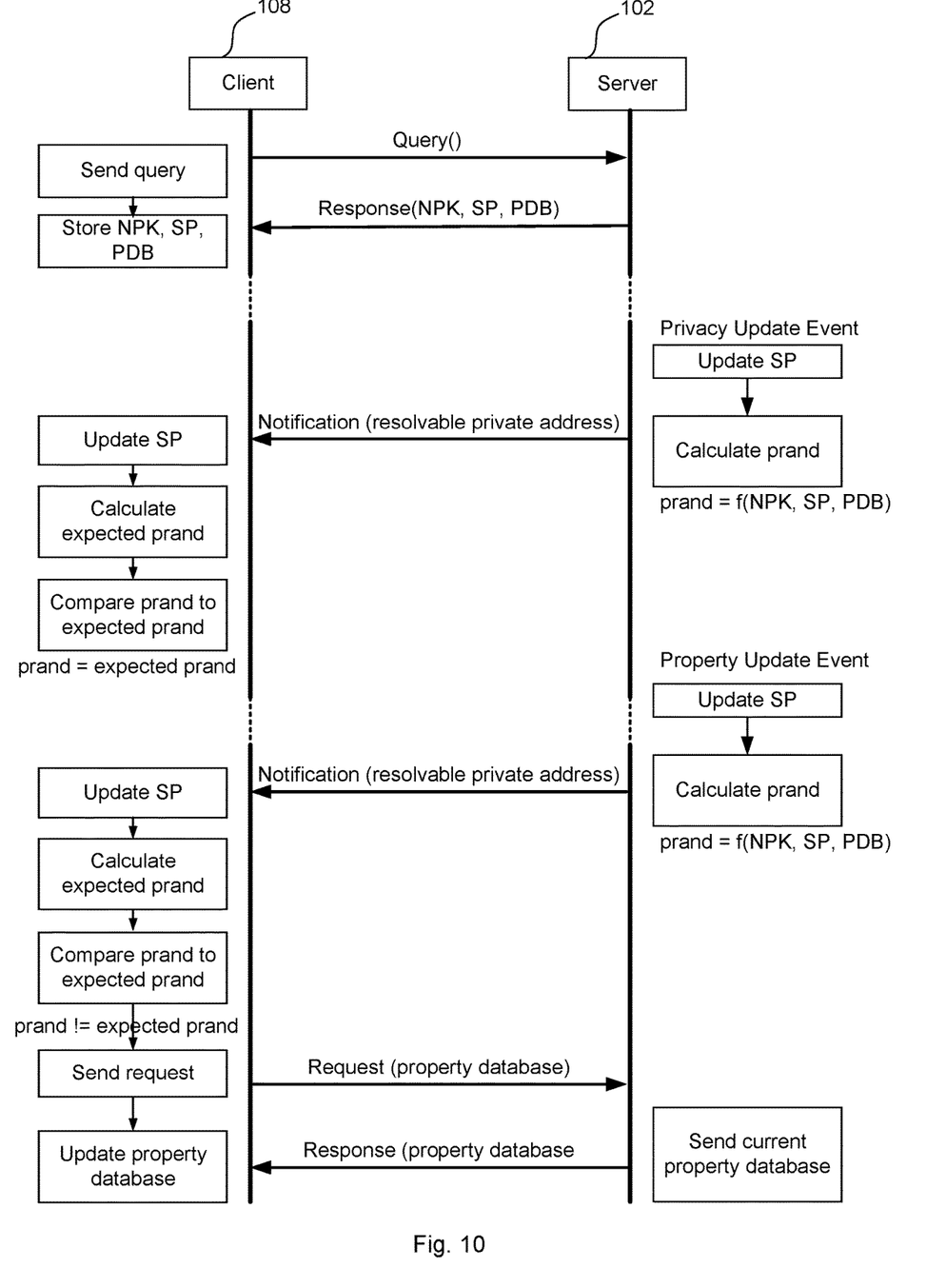
FIG. 10 illustrates the flow of messages between a server device and a client device for a privacy update event, and a property update event, according to an embodiment.

FIG. 10 illustrates the flow of messages between a server device and a client device, where the client device is configured to transmit a request to the server device for the current state of the property database of the server device, or an indication thereof.

If the client device determines, in step 904, that the expected prand does not equal the prand transmitted in the transmitter address field of a notification message, the client device transmits a request message to the server device. In response to receiving the request message, the server device transmits, in a response message, the current value of the server device's property database. In some examples, the server device transmits, in the response message, only the value and description of the property whose change of state triggered the notification message. The client device updates the property database stored in memory 306 in accordance with the update information provided in the response message from the server device.

Anticipate Current State Information

In some embodiments, the change of state of properties of the server device may be anticipated by the client device. This anticipation may be applicable in situations where the server device has only a small number of properties in the property database, or where the properties of the server device transition through an expected series of states, in accordance with normal function. For example, in the situation where the server device is a Bluetooth LE enabled door lock, and the property database contains a property which indicates whether the door is currently locked or unlocked, the client device may anticipate that the next state of this property.

Figure 11:
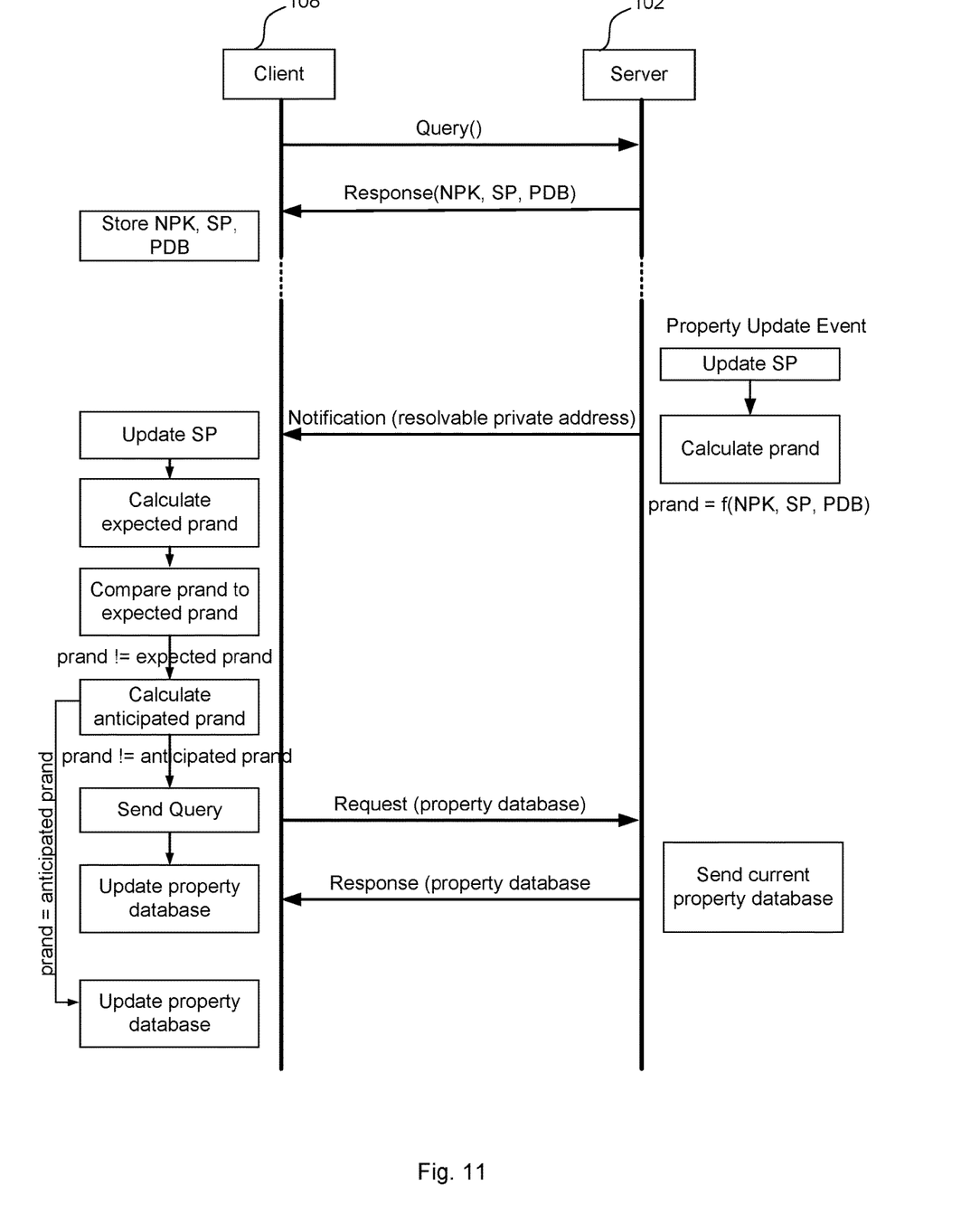
FIG. 11 illustrates the flow of messages between a server device and a client device for a property update event, according to an embodiment.

FIG. 11 illustrates the flow of messages between a server device and a client device, where the client device is configured to anticipate the change of state of a property of the server device. Upon receipt of a notification message, the client device calculates the expected prand value, based on the state values of the property database stored in the client device memory. If the client device determines that the expected prand value does not equal the prand value within the received notification message, the client device will determine that a change of state of a server device property has occurred.

The client device will then anticipate the change of state of a property of the server device (e.g. from locked to unlocked), and calculate an anticipated prand value based on the anticipated property database. If the anticipated prand value is equal to the received prand value, the client device updates the client stored property database to be equal to the anticipated property database. Advantageously, through this anticipation step, the client device can correctly determine the state change of a server property, through consideration of the transmitter address field of a notification message. Furthermore, advantageously, through this anticipation step, the client device can avoid transmitting a request messages to the server device to request the current value of the property database, or an indication thereof.

If the anticipated prand value is not equal to the received prand value, the client device may anticipate an alternative state change of a property of the property database, and may do so iteratively, until the anticipated prand value is equal to the expected prand value. Alternatively, the client device may send a request message to the server device to receive the changed property database, or an indication thereof.

Determine Current State Information

In one example, the current property database of the server device is communicated to the client device within the transmitter address field of a notification message transmitted by the server device. According to such an example, the one-way function is an encryption function, which applies the notification property key as an encryption key. The server device calculates the prand value by applying the encryption function to the concatenation of the property database and the sequence parameter. In response to receiving a notification message, including the prand, from the server device, the client device decrypts the prand value, using the client device's copy of the notification property key, or a complementary key thereto. Through decryption of the prand, the client device can determine the value of the server device's property database. If the decrypted property database is different from the client stored property database, the client device stores the decrypted property database as the current property database in memory 306.

Although resolvable private addresses have been described herein, in relation to the Bluetooth Low Energy Standard, it should be understood that private addresses that are resolvable by trusted message recipients may take other forms, and may be described by other standards. Accordingly, the description of resolvable private addresses in the context of the Bluetooth Low Energy standard should not be taken as limiting the present disclosure to application within this standard.

Depending upon the communication protocol applied, different terminology can be used to describe the device from which a message originates, and the device which receives the message. In some situations, the device from which a message originates may be termed an initiator, a transmitter or a server, and the device which receives a message may be termed a recipient, a client or a responding device.

As used within this disclosure, a server device is a device that covertly communicates state information with an address field of a transmitted message. Accordingly, no other limitation is to be inferred from the use of the term 'server' in relation to this disclosure.

Similarly, the term 'client' is intended to describe a device which receives a message transmitted by the abovementioned server device. Accordingly, no other context is to be attributed to the term 'client' in relation to this disclosure.

It is to be understood that references to random generated data or intervals is intended to include pseudo-randomly generated data or intervals. Furthermore, it is to be understood that references to transmit or transmitting is intended to include direct transmission via a wired or wireless communication channel, as well as broadcast transmission via a wire or wireless communication channel.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The invention claimed is:

1. A device configured to covertly communicate state information within a transmitter address field of a message, the device comprising:
 a memory configured to store a state key and a property database comprised of state information for a plurality of properties of the device; and
 a controller in communication with the memory, and configured to:
   apply a one-way function, using the state key, to the state information for the plurality of properties in the property database to produce a transmitter address, and
   transmit the message, including the transmitter address in the transmitter address field of the message.

2. The device of claim 1, wherein:
 applying the one-way function comprises producing a state indication data from the state information for the plurality of properties in the property database;
 the state indication data is indicative of the state information of the device; and the state indication data occupies a pseudo random number field in the transmitter address field of the message.

3. The device of claim 2, wherein:
the memory is further configured to store a device identification key; and
the controller is further configured to apply a hash function, using the device identification key, to the state indication data to produce a hash result.

4. The device of claim 3, wherein:
the transmitter address is a resolvable private address; and
the transmitter address comprises the state indication data and the hash result.

5. The device of claim 2, wherein:
the one-way function is a hash function; and
the one-way function comprises hashing the state information for the plurality of properties in the property database with the state key to produce the state indication data.

6. The device of claim 1, wherein:
the memory is further configured to store a sequence parameter; and
the controller is further configured to:
apply a sequence parameter update function to the sequence parameter to determine an updated sequence parameter, and
apply the one-way function, using the state key, to the updated sequence parameter as well as the state information, to produce the transmitter address.

7. The device of claim 6, wherein:
the sequence parameter is a numerical value; and
the sequence parameter update function is an increment of the sequence parameter.

8. The device of claim 6, wherein:
the sequence parameter update function is one of a plurality of sequence parameter update functions; and
the sequence parameter update function is selected as a function of the state information.

9. The device of claim 1, wherein:
the state information comprises, for each property of the plurality of properties in the property database, one or more values indicating an operational state of the device; and
the controller is further configured to transmit the message in response to a change in at least one of the one or more values which comprise the state information.

10. A method, performed by a communication device, of covertly communicating state information within a transmitter address field of a message, the communication device comprising a memory, configured to store a state key and state information of the communication device, the method comprising:
applying a one-way function, using a state key, to the state information, to produce a state indication data;
applying a hash function, using a device identification key, to the state indication data to produce a transmitter address; and
transmitting the message, including the transmitter address in the transmitter address field of the message.

11. A method, performed by a communication device, for determining a change in state information of a transmitter device from a transmitter address field of a received message, the communication device comprising a memory configured to store stored state information for a plurality of properties in a property database and a state key, the method comprising:

receiving a message from the transmitter device, the message including a transmitter address in a transmitter address field, wherein:
the transmitter address comprises received state indication data; and
the received state indication data is indicative of current state information for a plurality of properties in a property database of the transmitter device; and
determining, based on the received state indication data, whether the current state information is equal to the stored state information for the plurality of properties in the property database of the communication device.

12. The method of claim 11, further comprising:
determining an expected state indication data; and
determining that the current state information is equal to the stored state information responsive to the expected state indication data being equal to the received state indication data.

13. The method of claim 12, wherein determining the expected state indication data comprises applying a one-way function to the stored state information, using the state key.

14. The method of claim 13, further comprising:
storing a sequence parameter;
upon determining the state information, applying a sequence parameter update function to the sequence parameter to determine an updated sequence parameter, and replacing the stored sequence parameter with the updated sequence parameter; and
applying the one-way function to the updated sequence parameter as well as the stored state information, to determine the expected state indication data.

15. The method of claim 11, further comprising:
determining an anticipated state indication data, wherein the anticipated state indication data is based on an anticipated state information of the transmitter device.

16. The method of claim 15, further comprising:
responsive to the anticipated state indication data being not equal to the received state indication data, determining a second anticipated state indication data, wherein the anticipated state indication data is based on a second anticipated state information of the transmitter device.

17. The method of claim 15, further comprising:
responsive to the anticipated state indication data being equal to the received state indication data, updating the stored state information to the anticipated state information.

18. The method of claim 17, further comprising:
updating the stored state information to the anticipated state information indicated by the anticipated state indication data.

19. The method of claim 11, further comprising:
determining, based on the received state indication data, that the current state information is not equal to the stored state information; and
transmitting a request message to the transmitter device requesting the current state information.

20. A device for covertly communicating state information within a transmitter address field of a message, the device comprising:
means for storing a state key, a device identification key, and state information of the device;
means for applying a one-way function, using the state key, to the state information to produce state indication data;

means for applying a hash function, using the device identification key, to the state indication data to produce a transmitter address; and means for transmitting the message, including the transmitter address in the transmitter address field of the message.

\* \* \* \* \*